United States Patent
Wolfson et al.

(10) Patent No.: US 10,393,854 B1
(45) Date of Patent: Aug. 27, 2019

(54) ENHANCED ELEVATION DETECTION FOR EMERGENCY RESPONSE SYSTEMS

(71) Applicant: International Business Machines Corporation, Armonk, NY (US)

(72) Inventors: Charles D. Wolfson, Austin, TX (US); Sushain Pandit, Austin, TX (US); David A. Selby, Nr Fareham (GB); Brent Gross, Alberta (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/145,901

(22) Filed: Sep. 28, 2018

(51) Int. Cl.
| | | |
|---|---|---|
| H04M 11/04 | (2006.01) | |
| G01S 5/02 | (2010.01) | |
| H04W 4/90 | (2018.01) | |
| G01C 5/06 | (2006.01) | |
| G08B 25/01 | (2006.01) | |
| H04W 4/029 | (2018.01) | |
| G06F 16/29 | (2019.01) | |

(52) U.S. Cl.
CPC .............. *G01S 5/0257* (2013.01); *G01C 5/06* (2013.01); *G06F 16/29* (2019.01); *G08B 25/016* (2013.01); *H04W 4/029* (2018.02); *H04W 4/90* (2018.02)

(58) Field of Classification Search
CPC ....... G01S 5/0257; H04W 4/029; H04W 4/90; G06F 16/29; G01C 5/06; G08B 25/016
See application file for complete search history.

(56) References Cited

U.S. PATENT DOCUMENTS

| | | | | |
|---|---|---|---|---|
| 6,518,918 B1 * | 2/2003 | Vannucci | ................. | G01O 5/06 |
| | | | | 137/81.1 |
| 8,938,210 B1 * | 1/2015 | Otto | ........................ | H04W 4/90 |
| | | | | 455/404.2 |
| 2014/0135040 A1 * | 5/2014 | Edge | ...................... | H04W 4/025 |
| | | | | 455/456.6 |
| 2016/0047649 A1 * | 2/2016 | Edge | ...................... | H04W 4/025 |
| | | | | 455/73 |
| 2017/0219342 A1 * | 8/2017 | Morioka | ............... | H04W 4/025 |

OTHER PUBLICATIONS

List of IBM Related Dockets, Appendix P, 2018.

* cited by examiner

*Primary Examiner* — Pakee Fang

(74) *Attorney, Agent, or Firm* — Garg Law Firm, PLLC; Rakesh Garg; Reza Sarbakhsh

(57) ABSTRACT

At an emergency response system, a first location including a latitude and a longitude at which a first device is located is received. At an emergency response system, an air pressure reading measured by the first device is received. Using the air pressure reading and a mean sea-level barometric measurement, a first elevation of a device is computed. Using the first location, a corresponding street address is computed. Using the street address and the first elevation, a floor number is computed. The street address and the floor number are transmitted to a second device.

7 Claims, 9 Drawing Sheets

ENHANCED ELEVATION DETECTION FOR EMERGENCY RESPONSE SYSTEMS

TECHNICAL FIELD

The present invention relates generally to a method, system, and computer program product for geolocation. More particularly, the present invention relates to a method, system, and computer program product for enhanced elevation detection for emergency response systems.

BACKGROUND

Emergency response systems—also known as 911 systems in the United States and Canada, but known by other numbers elsewhere—cannot only rely on the caller correctly relying the location of an emergency to dispatchers. Callers may be lost, too incapacitated to provide address details, too young to know such details, be outdoors in a location without a definitive street address, or simply have forgotten in the stress of the emergency.

More modern emergency response systems (for example, Enhanced 911 or E911 in the United States and Canada) include the capability to send a caller's location to emergency dispatchers automatically. A database matches calls from landlines with the known address of that landline. However, the database must be kept up to date to be effective. As well, large office telephone systems may only indicate one central location, even though there are many extensions that could be called from.

Cellular telephones do not have fixed addresses to store in a database. Instead, cellular telephones may be located by triangulating such devices using the cellular transmission towers they are within range of. For example, if a device is within the range of three transmission towers, the device must be within the intersection of the coverage areas of these three towers. However, triangulation is imprecise, particularly in rural areas where towers are sparse and may have wide coverage areas.

More modern cellular telephones, such as smartphones, include components to report their location using satellite-based navigation systems such as the Global Positioning System (GPS). However, GPS relies on triangulation of signals from orbiting satellites, so is most accurate outdoors, away from nearby buildings that attenuate or distort weak GPS signals form the satellites.

Smartphones may also make calls using voice-over-Wi-Fi services, or supplement GPS location capability using other available signals such as Wi-Fi and Bluetooth. (Bluetooth is a registered trademark of Bluetooth SIG, Inc.) However, such systems may also rely on databases that must be kept up to date and can improve precision only in areas where they are available. For example, one recent study found an overall location accuracy of about 120 meters, even with all available sensors contributing.

In addition, all such location systems locate a caller based on the latitude and longitude of the calling device, and cannot compute a caller's exact elevation. As a result, emergency responders often have difficulty finding callers, particularly in large multi-floored buildings. For example, while a caller could summon help to a twenty-story office building, emergency responders would have much more difficulty locating the correct floor and office suite within the building.

SUMMARY

The illustrative embodiments provide a method, system, and computer program product. An embodiment includes a method that receives, at an emergency response system, a first location including a latitude and a longitude at which a first device is located. An embodiment receives, at an emergency response system, an air pressure reading measured by the first device. An embodiment computes, using the air pressure reading and a mean sea-level barometric measurement, a first elevation of a device. An embodiment computes, using the first location, a corresponding street address. An embodiment computes, using the street address and the first elevation, a floor number. An embodiment transmits, to a second device, the street address and the floor number. Thus, the embodiment provides a method that computes a street address and floor number from a location, and transmits the street address and floor number to a second device.

Another embodiment includes a method wherein determining a corresponding street address includes comparing, using a processor and a memory, the first location against a database of known points of interest; and associating, responsive to determining that the first location is within a pre-determined threshold of a point of interest in the database, the location with the street address of the point of interest. Thus, the embodiment provides a method that determines a street address using a database of known points of interest.

Another embodiment includes a method wherein determining a corresponding street address includes comparing, using a processor and a memory, the first location against a set of stored locations having corresponding street addresses; and associating, responsive to determining that the first location is within a pre-determined threshold of a second location in the set of stored locations, the first location with the street address of the second location. Thus, the embodiment provides a method that determines a street address using a set of stored locations.

Another embodiment includes a method wherein determining a corresponding street address includes comparing, using a processor and a memory, the first location against a database of known points of interest; and associating, responsive to determining that the first location is within a pre-determined threshold of two points of interest in the database having street addresses on the same street, the first location with a street address comprising an interpolation between the street addresses of the two points of interest. Thus, the embodiment provides a method that determines a street address using a database of known points of interest.

Another embodiment includes a method wherein computing the floor number includes determining, from a database, a ground elevation corresponding to the street address; determining, from a database, a median floor height corresponding to the street address; and computing the floor number using the expression altitude−(Gh+Ah))/Eh, wherein altitude comprises the first elevation, Gh comprises the ground elevation, Eh comprises the median floor height, Ah comprise an average human waist height, and a result of the expression is rounded to the nearest whole number. Thus, the embodiment provides a method that uses the street address to compute the floor number.

Another embodiment includes a method that determines, from a database using a processor and a memory, that the street address corresponds to a building having non-standard floor numbering. An embodiment determines that the floor number is affected by the non-standard floor numbering. An embodiment adjusts, responsive to the first and second determining, the floor number to compensate for the non-standard floor numbering. Thus, the embodiment provides a method that adjusts the floor number for non-standard floor numbering.

Another embodiment includes a method that receives, at an emergency response system, location information for a responder. An embodiment determines, using the street address, the first elevation, and the floor number, a horizontal distance and a vertical distance to the location of the responder. An embodiment reports, to the first device, the horizontal distance and the vertical distance. Thus, the embodiment provides a method that reports a horizontal and vertical distance between a device and a responder's device.

Another embodiment includes a method that determines that the horizontal distance is below a horizontal distance threshold and that the vertical distance is below a vertical distance threshold. An embodiment reports, to the first device, a proximity alert. Thus, the embodiment provides a method that reports a proximity alert when the horizontal and vertical distance between a device and a responder's device is sufficiently small.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
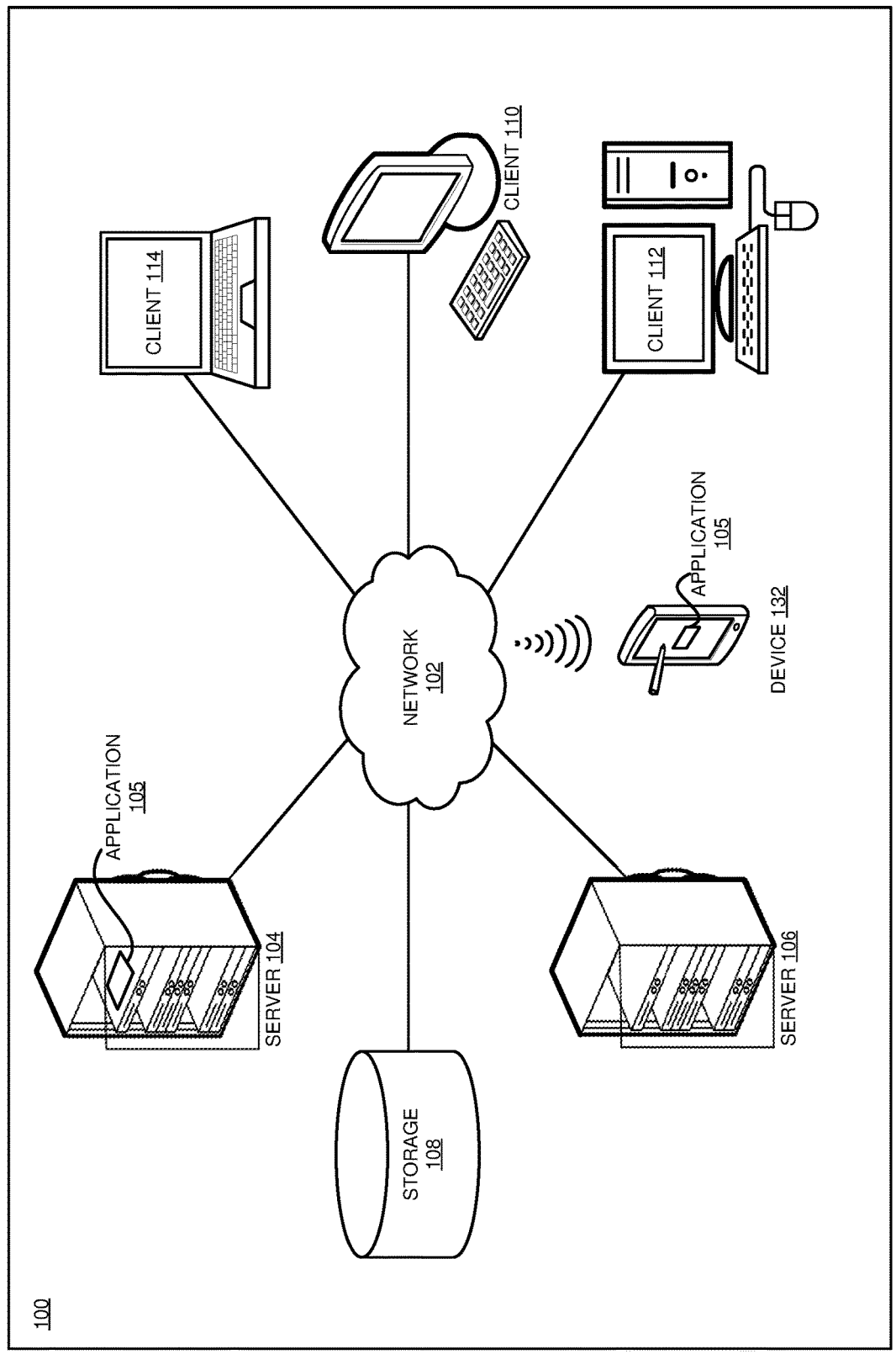
FIG. 1 depicts a block diagram of a network of data processing systems in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other problems related to enhanced elevation detection for emergency response systems.

An embodiment can be implemented as firmware or using a combination of hardware and a software application. The application implementing an embodiment can be configured as a modification of an emergency response system, as a separate application that operates in conjunction with an existing emergency response system, a standalone application, or some combination thereof.

Particularly, some illustrative embodiments provide a method by which a device's elevation, as well as latitude and longitude, can be determined and provided to an emergency response system, and a method by which an emergency response system can make use of the information.

An embodiment is capable of calling an emergency response system and communicating with the emergency response system using audio, audio and video, text, or any combination thereof. An embodiment is equipped to call an emergency response system (such as 911 in the United States and Canada or a local equivalent elsewhere) over a landline or cellular telephone network or using a voice-over-IP system. Another embodiment is equipped to exchange text messages, in any suitable format over any suitable network, with an emergency response system equipped to communicate using text messages. Another embodiment is equipped to exchange video as well as audio with an appropriately-equipped emergency response system. Another embodiment can exchange data, in any suitable format over any suitable network, with an emergency response system equipped to receive the data and forward the data to appropriately-equipped emergency responders.

An embodiment is capable of determining its location. For example, one embodiment uses a satellite-based navigation system, such as GPS. Another embodiment supplements GPS location capability using other available signals, such as Wi-Fi and Bluetooth. An embodiment determines its location when a user initiates a call to an emergency response system, or at any suitable earlier time.

An embodiment includes a barometer or other suitable air pressure sensor capable of sensing atmospheric air pressure at the embodiment. To begin the process of elevation determination, an embodiment takes an air pressure measurement. Alternatively, an embodiment takes a series of measurements and computes a moving or weighted average of the series, to smooth out noise and outlier measurements. For example, one embodiment uses a moving average of the last eight periodic measurements. An embodiment determines its elevation when a user initiates a call to an emergency response system, or at any suitable earlier time.

Air pressure decreases, roughly exponentially, as elevation above a reference point called mean sea level increases. Thus, air pressure measurements can be used to determine elevation. For example, the International Standard Atmosphere has a pressure reading of 29.92 inches of mercury, or 1013.2 millibars or hectopascals, at sea level (0 feet or 0 meters of elevation). In the lower atmosphere, for every 1000 feet (305 meters) of elevation increase, the pressure decreases approximately 1 inch of mercury or 34 millibars. Thus, assuming a standard atmosphere, an air pressure reading at a location determines the elevation of that same location.

However, the real atmosphere is not standard. Instead, air pressure varies with air temperature (cold air is typically denser than warm air) and as high- and low-pressure weather systems move through a location. To compensate, an embodiment must compute a correction. Weather stations, such as those at airports, report mean sea-level barometric pressure, or the barometric pressure that would be measured at the weather station if the weather station was at sea level. For example, a weather station might report a mean sea-level barometric pressure of 30.2 inches of mercury on a sunny winter day, and 29.1 inches of mercury during an intense summer rainstorm. Current (typically hourly) mean sea-level barometric pressure for various locations are available through many weather-related data sources.

Thus, an embodiment corrects its air pressure measurements against a nearby mean sea-level barometric pressure measurement. If no measurement is within a pre-defined threshold distance, an embodiment corrects its air pressure measurements against the average of several more distant mean sea-level barometric pressure measurements. Other methods of obtaining a suitable mean sea-level barometric pressure measurement for correction purposes are also possible, and contemplated within the scope of the illustrative embodiments. One correction method uses the expression: altitude=c*(1.0−(Pma/P0)^t)+bias, where altitude denotes the altitude of the air pressure sensor corrected for non-standard air pressure, Pma denotes an air pressure measurement, P0 denotes a nearby mean sea-level barometric pressure measurement, and c, t, and bias are constants applicable to the particular barometric sensor of the embodiment. In this expression, altitude is in meters and pressure measurements are in Pascals. For example, in one embodiment, c=44330.77, t=0.1902632, and bias=0. If, after testing during an implementation phase of the embodiment, the expression results in inaccurate results when used at known altitudes using a variety of pressure readings, any of bias, c, and t may be adjusted as necessary to obtain consistently correct results over an expected variety of atmospheric conditions and known elevations.

An embodiment also determines its horizontal location, for example in terms of latitude and longitude. An embodiment may use GPS for this purpose, or GPS supplemented by another method, or any other suitable method.

From the determined location, an embodiment determines a corresponding street address. One embodiment compares the location against a database of known points of interest. If the location is within a pre-determined threshold of a point of interest in the database, the embodiment uses the stored address of that point of interest. If no point of interest in the database is close enough to the location, or if the database is unavailable, an embodiment determines whether registered location information, for example from an app associated with the embodiment, is available and within a within a pre-determined threshold of the location. For example, a user may have previously associated the current location with a location saved as "office", with a corresponding street address, in a navigation or weather app. If no match is within the threshold using this method either, an embodiment reverse geocodes the location into a corresponding street address. Reverse geocoding converts a location, in latitude and longitude, to an interpolated street address. For example, if the location resolves to coordinates near the midpoint of a road segment that starts with address 1 and ends with 100, the interpolated street address will be somewhere near 50. Due to the interpolation, reverse geocoding is not as accurate as the preceding methods, so is only used if the other methods do not provide useful information.

An embodiment uses the street address to determine if the caller is inside a building. If so, an embodiment uses the street address and the altitude to determine which floor of the building the caller is on. In particular, an embodiment obtains the height of the ground at the location using publicly-available data. An embodiment also obtains an estimated median floor height for a region corresponding to the location. For instance, New York City skyscrapers may have a different median floor height—perhaps 12 feet—than buildings in the Rochester, N.Y. suburbs—perhaps 10 feet—due to regional variations in building codes, local preferences, or differences in construction methods between tall city skyscrapers and lower-rise suburban buildings. An embodiment also takes into account a typical human waist height, to account for an embodiment being held at waist level for pressure readings, then being raised to head level for calling. In particular, an embodiment computes a floor number using the expression: floor=round((altitude−(Gh+Ah))/Eh), where floor denotes a floor number, altitude=the computed altitude of the embodiment, Gh=the ground height and Eh=the estimated median floor height for the location, and Ah=an average human waist height. Here, the round( ) function rounds a parameter to the nearest whole number, and all units are in a suitable height unit, such as meters.

An embodiment also makes additional floor corrections, if appropriate data is available for the location. For example, because some travelers consider the number 13 unlucky, some hotels skip 13 when numbering floors, and instead floor 14 is immediately above floor 12. If an embodiment determines a location in such a hotel, and the floor calculation indicates the fifteenth floor (above the skipped floor number, the embodiment adds one to the floor number to compensate.

Thus, when a user of an embodiment initially contacts an emergency response system, the embodiment reports the user's location and, if indoors, a calculated floor, to the emergency response system.

In addition, an embodiment continues to monitor pressure changes and re-compute the altitude for both the caller and a first responder also equipped with the embodiment. As a result, the embodiment determines the approximate planar distance and altitude difference between the caller and the first responder. This determination assists the first responder in locating the caller, and indicates the closeness of help to the caller.

One embodiment displays an indication of how high (or low) the caller is relative to the first responder, to assist both parties in locating each other. For example, an embodiment uses a scale of −10 to +10 to indicate proximity, with +10 denoting closest proximity and −10 denoting furthest away. Other scales, and indicators such as floor numbers, distance measurements, and the number of floors separating the parties are also possible and contemplated within the scope of the illustrative embodiments.

In one embodiment, when the weighted combination of the difference in location and altitude between the caller and the first responder falls below a pre-defined threshold, the embodiment notifies the caller, the first responder, or both— thus alerting the caller that help is almost there and letting the first responder know that the subject is nearby. Another embodiment includes several alert levels, at decreasing proximity thresholds.

The manner of enhanced elevation detection for emergency response systems described herein is unavailable in the presently available methods. A method of an embodiment described herein, when implemented to execute on a device or data processing system, comprises substantial advancement of the functionality of that device or data processing system in accurately determining height within a multi-story building to an emergency response system.

The illustrative embodiments are described with respect to certain types of emergency response systems, communications, location sensing systems, sensors, corrections, databases, thresholds, validations, responses, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

Another embodiment, implemented as part of an emergency response system or as a standalone application operating in conjunction with an emergency response system, is capable of receiving calls to an emergency response system and communicating with the calling device using audio, audio and video, text, or any combination thereof. The embodiment can exchange data, in any suitable format over any suitable network, with a device calling an emergency response system. The embodiment is equipped to receive the data and forward the data to appropriately-equipped emergency responders.

When a suitably-equipped calling device initially contacts an emergency response system, an embodiment receives reports of the calling device's location and, if indoors, a calculated floor number on which the device is located. In addition, an embodiment receives periodic updates of the calling device's location and floor number. An embodiment also receives periodic updates of location and floor number for a first responder's device, when the first responder's device is within a threshold proximity of the calling device's location and floor number. The embodiment relays the first responder's location and floor number to the calling device, and relays the calling device's location and floor number to the first responder's device, to assist the caller and first responder in locating each other.

Alternatively, an embodiment receives reports of the calling device's location and air pressure measurement, or reports of a first responder's device's location and air pressure measurement, and computes a calculated floor number on which each device is located as well as horizontal and vertical distances between the two devices.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
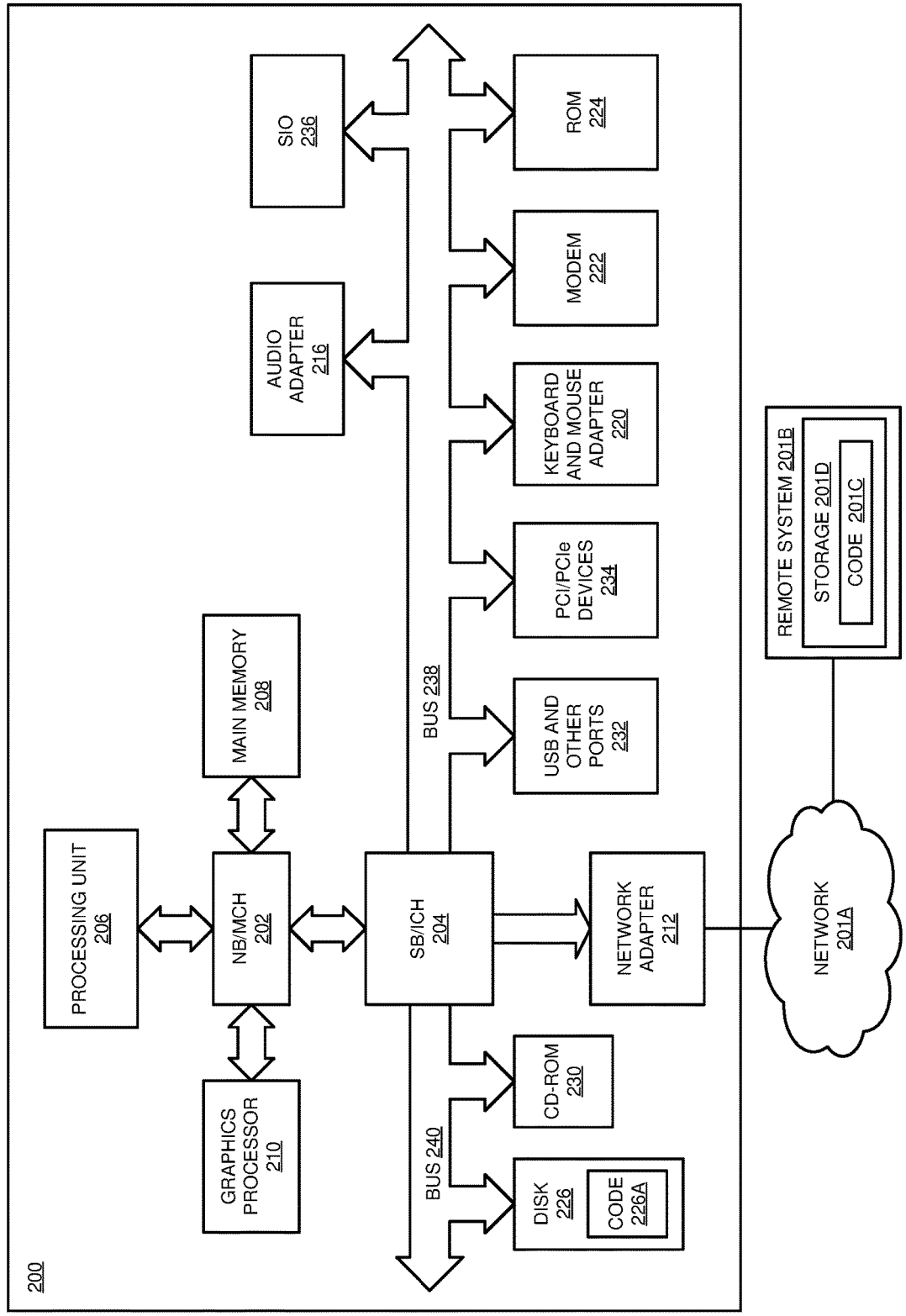
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device capable of contacting an emergency response system. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 runs on device 132. Application 105 implements another embodiment described herein. Application 105 runs on any of servers 104 and 106, clients 110, 112, and 114, or any other suitable location connected to network 102.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
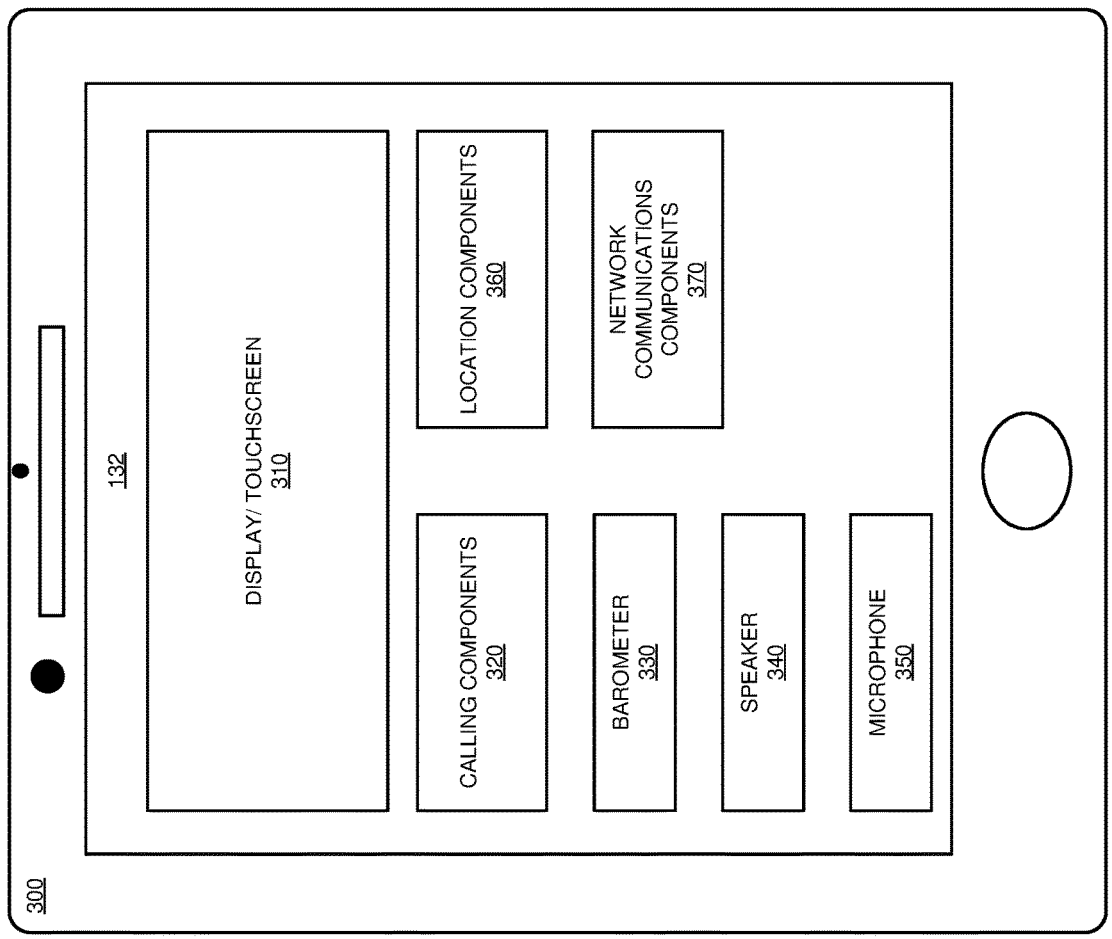
FIG. 3 depicts a block diagram showing hardware components of an example device for enhanced elevation detection for emergency response systems in accordance with an illustrative embodiment.

With reference to FIG. 3, this figure depicts a block diagram showing hardware components of an example device 132 for enhanced elevation detection for emergency response systems in accordance with an illustrative embodiment. Device 132 may be an end-user's device, used in calling an emergency response system for assistance, an emergency responder's device, or both. Device 132 is the same as device 132 in FIG. 1.

Device 132 includes display/touchscreen 310, which is suitable for displaying proximity indications when a first responder is nearby. As a display, component 310 is also suitable for displaying other device and call status indications. For example, display 310 may display messages or other indications that emergency services are being contacted, that emergency services have answered the call, that emergency services are en route, and that the device's location, elevation, and floor have been determined. In addition, component 310 functions as a touchscreen, allowing the display of virtual keys a user can touch to input data, such as text or a telephone number, to device 132.

Device 132 includes calling components 320, which are capable of calling an emergency response system and communicating with the emergency response system using audio, audio and video, text, or any combination thereof. Device 132 also includes speaker 340 and microphone 350, for use in communicating with an emergency response system.

Device 132 also includes location components 360, which are capable of determining the location of device 132. Location components 360 uses GPS, a satellite-based navigation system. Location components 360 supplement GPS location capability using other signals, such as Wi-Fi and Bluetooth, when available.

Device 132 also includes barometer 330 capable of sensing atmospheric air pressure at device 132. Device 132 also includes network communications components 370. Components 370 allow device 132 to communicate over a data network, such as network 102 in FIG. 1, to obtain information. Such information includes mean sea-level barometric pressures for nearby locations, a database of known points of interest, registered location information, and the information required to perform reverse geocoding. In addition, device 132 can communicate with an emergency response system using network communications components 370 in addition to or instead of calling components 320.

Figure 4:
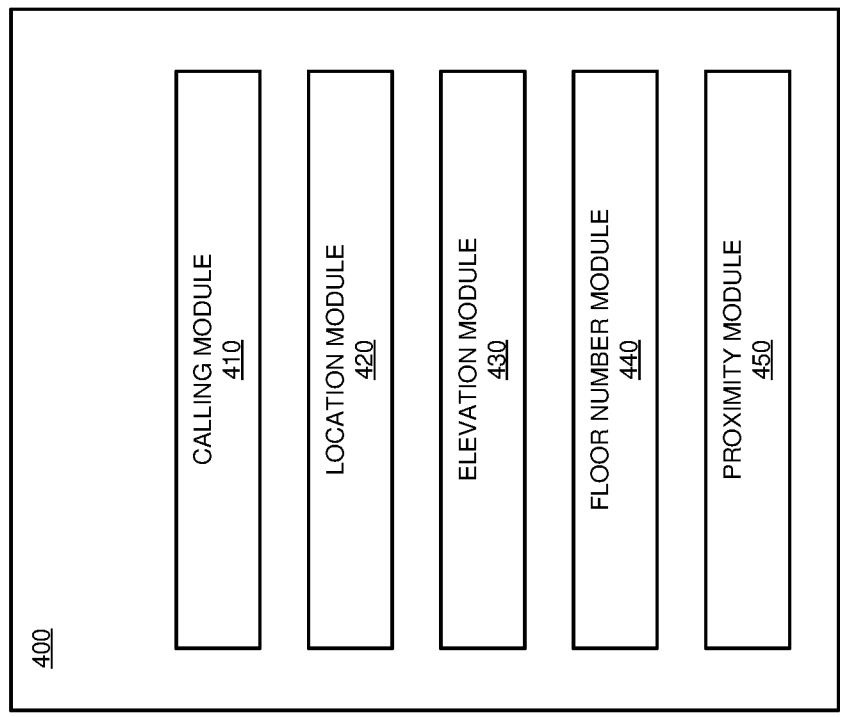
FIG. 4 depicts a block diagram of an example configuration for enhanced elevation detection for emergency response systems in accordance with an illustrative embodiment.

With respect to FIG. 4, this figure depicts a block diagram of an example configuration for enhanced elevation detection for emergency response systems in accordance with an illustrative embodiment. Application 400 is an example of application 105 in FIG. 1, and runs in device 132 in FIG. 1 or FIG. 3. Application 400 runs in an end-user's device, used in calling an emergency response system for assistance, an emergency responder's device, or both.

Calling module 410 is responsible for calling an emergency response system and communicating with the emergency response system using audio, audio and video, text, or any combination thereof. Calling module 410 uses a landline or cellular telephone network, a data network such as network 102 in FIG. 1, or any other suitable method supported by installed hardware and available connectivity.

Location module 420 is responsible for determining the location of device 132, making use of GPS hardware and supplemented with other signals, such as Wi-Fi and Bluetooth, when available. Elevation module 430 determines the elevation of device 132, using local barometric pressure measurements corrected by mean sea-level barometric pressure measurements from nearby locations. Floor number module 440 converts the elevation measurement performed by elevation module 430 into a floor number on which device 132 is situated, based on the height of the ground at the location of device 132, the estimated median floor height for a region corresponding to the location, and a typical human waist height. In particular, floor number module 440 computes a floor number using the expression: floor=round ((altitude−(Gh+Ah))/Eh), where floor denotes a floor number, altitude=the computed altitude of the embodiment, Gh=the ground height and Eh=the estimated median floor height for the location, Ah=an average human waist height, and the round( ) function rounds a parameter to the nearest whole number. Floor number module 440 also makes additional floor corrections, if appropriate data is available for the location of device 132.

In addition, proximity module 450 determines the approximate planar distance and altitude difference between a caller using device 132 and a first responder responding to an emergency call. This determination assists the first responder in locating the caller, and indicates the closeness of help to the caller.

Figure 5:
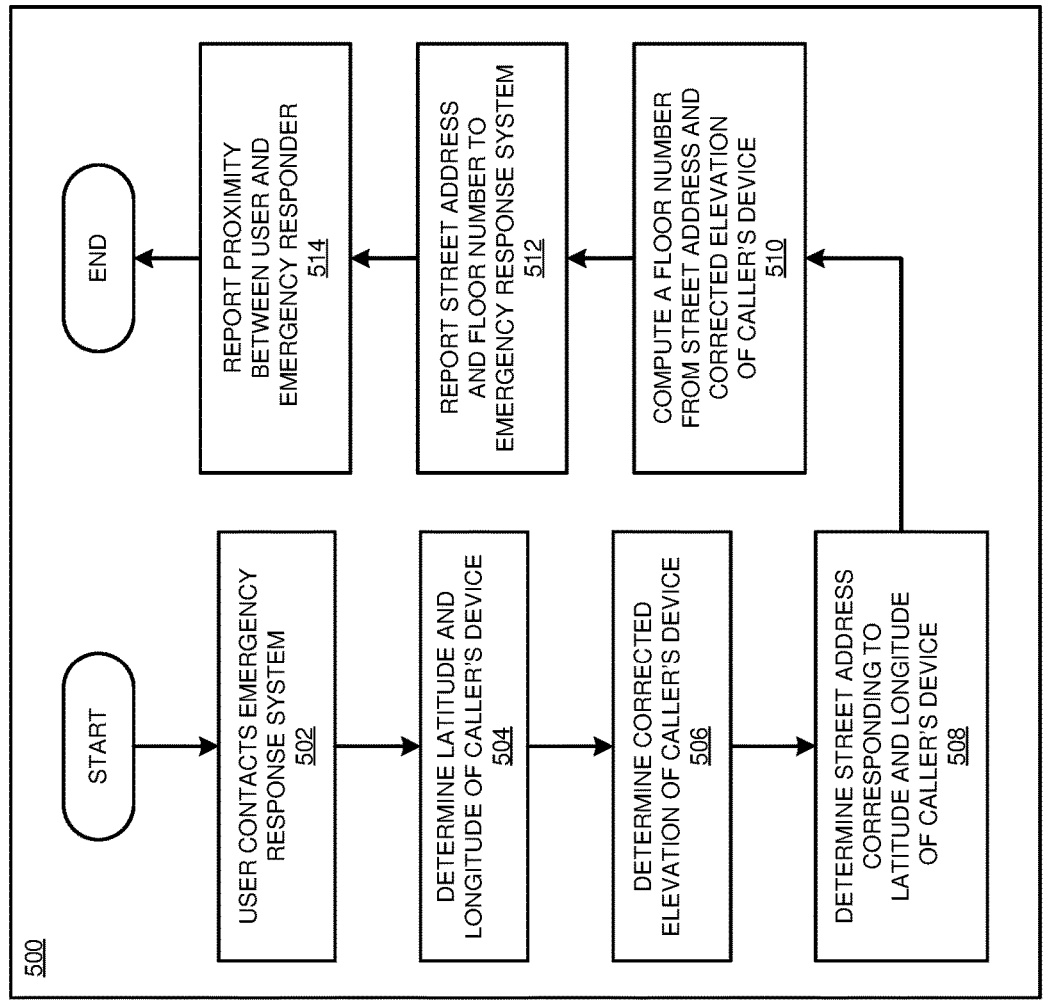
FIG. 5 depicts a flowchart of an example process for enhanced elevation detection for emergency response systems in accordance with an illustrative embodiment.

With reference to FIG. 5, this figure depicts a flowchart of an example process for enhanced elevation detection for emergency response systems in accordance with an illustrative embodiment. Process 500 can be implemented in application 400 in FIG. 4 and runs on device 132 in FIG. 3. Process 500 runs in an end-user's device, used in calling an emergency response system for assistance, an emergency responder's device, or both.

The process begins in block 502, in which a user contacts an emergency response system. In block 504, the application determines the location, in latitude and longitude, of the caller's device. In block 506, the application determines the corrected elevation of the caller's device. In block 508, the application determines a street address corresponding to the location, in latitude and longitude, of the caller's device. In block 510, the application computes a floor number from the street address and the corrected elevation of the caller's device. In block 512, the application reports the street address and computed floor number to the emergency response system. Finally, in block 514, the application reports on the proximity between the user and an emergency responder attempting to find the user.

Figure 6:
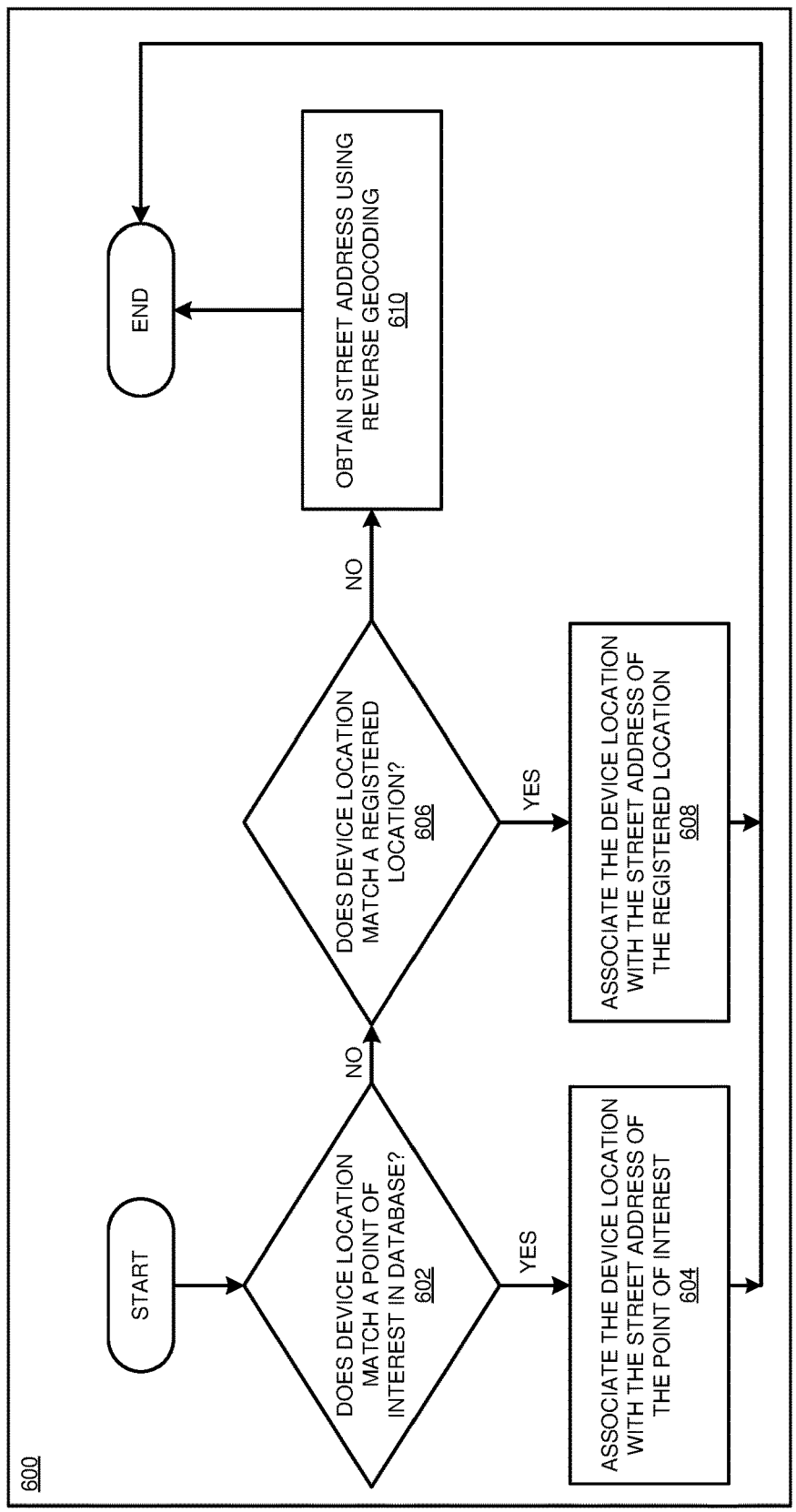
FIG. 6 depicts a flowchart of a portion of an example process for enhanced elevation detection for emergency response systems in accordance with an illustrative embodiment.

With reference to FIG. 6, this figure depicts a flowchart of a portion of an example process for enhanced elevation detection for emergency response systems in accordance with an illustrative embodiment. Process 600 can be implemented in application 400 in FIG. 4 to run in an end-user's device, used in calling an emergency response system for assistance, an emergency responder's device, or both, such as device 132 in FIG. 3, Process 600 can also be implemented in application 800 in FIG. 8 to run in a call-receiving application of an emergency response system on servers 104 and 106, or clients 110, 112, and 114 in FIG. 1. Process 600 provides more detail regarding block 508 in FIG. 5 and block 908 in FIG. 9.

The process begins in block 602, where the application determines whether the device's location matches a point of interest in a point of interest database. If yes ("YES" path of block 602), in block 604 the application associates the device's location with the street address of the point of interest, then the application ends. If no ("NO" path of block 602), in block 606 the application determines whether the device's location matches an already-registered location. If yes ("YES" path of block 606), in block 608 the application associates the device's location with the street address of the already-registered location, then the application ends. Otherwise (("NO" path of block 606), in block 610 the application computes a street address corresponding to the device's location using reverse geocoding, then the application ends.

Figure 7:
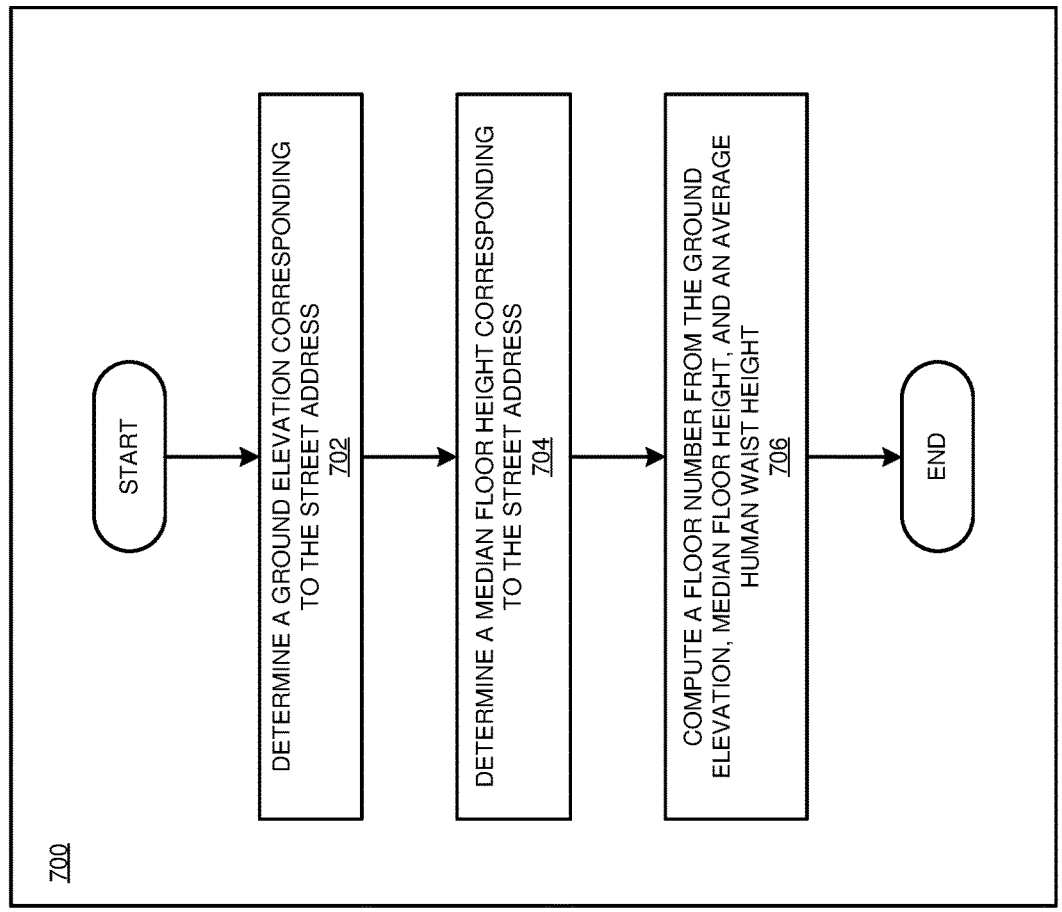
FIG. 7 depicts a flowchart of a portion of an example process for enhanced elevation detection for emergency response systems in accordance with an illustrative embodiment.

With reference to FIG. 7, this figure depicts a flowchart of a portion of an example process for enhanced elevation detection for emergency response systems in accordance with an illustrative embodiment. Process 700 can be implemented in application 400 in FIG. 4 to run in an end-user's device, used in calling an emergency response system for assistance, an emergency responder's device, or both, such as device 132 in FIG. 3, Process 700 can also be implemented in application 800 in FIG. 8 to run in a call-receiving application of an emergency response system on servers 104 and 106, or clients 110, 112, and 114 in FIG. 1. Process 700 provides more detail regarding block 510 in FIG. 5 and block 910 in FIG. 9.

The application starts in block 702, where the application determines a ground elevation corresponding to the already-computed street address for the device. In block 704, the application determines a median floor height corresponding to the already-computed street address for the device. Then in block 706 the application computes a floor number from the ground elevation, median floor height, and an average human waist height. Then the application ends.

Figure 8:
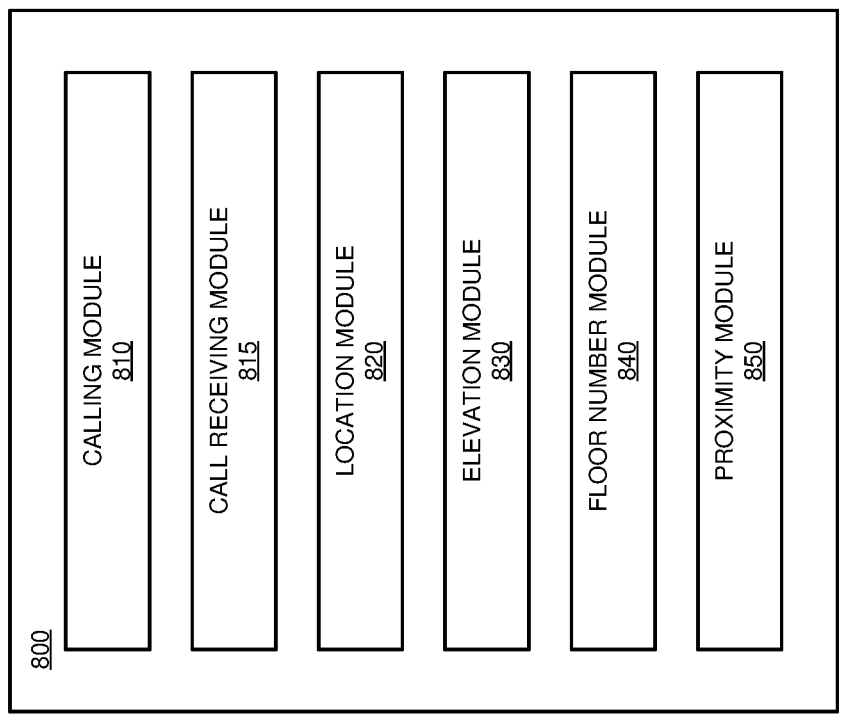
FIG. 8 depicts a block diagram of another example configuration for enhanced elevation detection for emergency response systems in accordance with an illustrative embodiment.

With respect to FIG. 8, this figure depicts a block diagram of another example configuration for enhanced elevation detection for emergency response systems in accordance with an illustrative embodiment. Application 800 is an example of application 105 in FIG. 1, and runs in server 104 in FIG. 1 in communication with device 132 in FIG. 1, or any other suitable location.

Calling module 810, implemented as part of an emergency response system, is responsible for calling device 132 and communicating with device 132 using audio, audio and video, text, or any combination thereof. Calling module 810 uses a landline or cellular telephone network, a data network such as network 102 in FIG. 1, or any other suitable method supported by installed hardware and available connectivity.

Call receiving module 815 is responsible for receiving calls from device 132 to an emergency response system and communicating with device 132 using audio, audio and video, text, or any combination thereof. Calling module 415 uses a landline or cellular telephone network, a data network such as network 102 in FIG. 1, or any other suitable method supported by installed hardware and available connectivity.

Location module 820 is responsible for receiving data for location of device 132. Elevation module 830 determines the elevation of device 132, by receiving barometric pressure measurements from device 132, and correcting the barometric pressure measurements using mean sea-level barometric pressure measurements from nearby locations. Floor number module 840 converts the elevation measurement performed by elevation module 830 into a floor number on which device 132 is situated, based on the height of the ground at the location of device 132, the estimated median floor height for a region corresponding to the location, and a typical human waist height. In particular, floor number module 840 computes a floor number using the expression: floor=round ((altitude−(Gh+Ah))/Eh), where floor denotes a floor number, altitude=the computed altitude of the embodiment, Gh=the ground height and Eh=the estimated median floor height for the location, Ah=an average human waist height, and the round( ) function rounds a parameter to the nearest whole number. Floor number module 840 also makes additional floor corrections, if appropriate data is available for the location of device 132.

In addition, proximity module 850 determines the approximate planar distance and altitude difference between a caller using device 132 and a first responder responding to an emergency call. This determination assists the first responder in locating the caller, and indicates the closeness of help to the caller.

Figure 9:
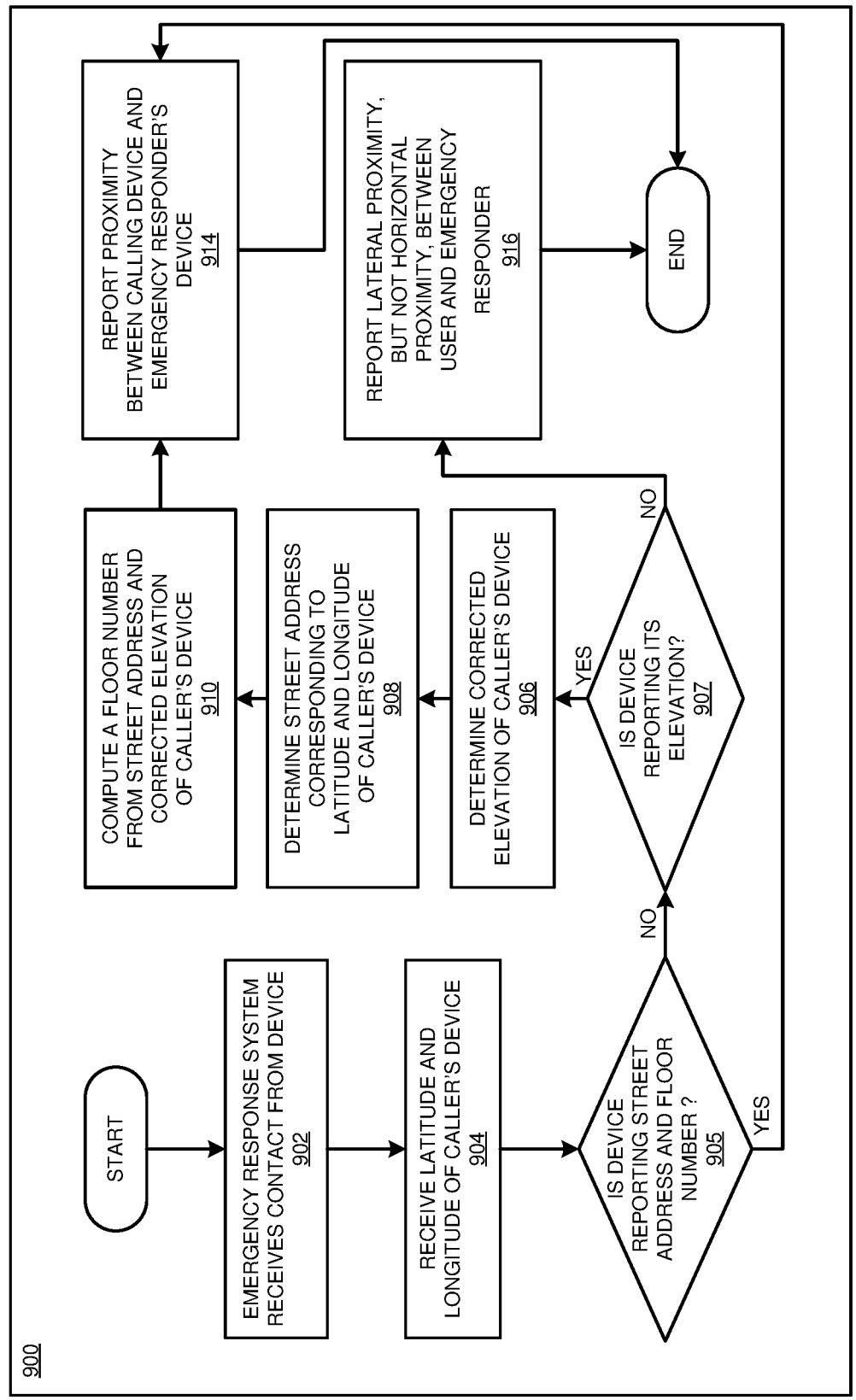
FIG. 9 depicts a flowchart of an example process for enhanced elevation detection for emergency response systems in accordance with an illustrative embodiment.

With reference to FIG. 9, this figure depicts a flowchart of an example process for enhanced elevation detection for emergency response systems in accordance with an illustrative embodiment. Process 900 can be implemented in application 800 in FIG. 8 and runs in server 104 in FIG. 1 in communication with device 132 in FIG. 1, or any other suitable location.

The process begins in block 902, an emergency response system receives contact from a device, for example, device 132. In block 904, the application receives the location, in latitude and longitude, of the caller's device. In block 905, the application determines whether the caller's device is reporting a street address and floor number. If no ("NO" path of block 905, in block 907 the application determines whether the caller's device is reporting its elevation. If no ("NO" path of block 907, in block 916 the application reports lateral proximity, but not horizontal proximity, between the user and an emergency responder attempting to find the user. If yes ("YES" path of block 907, in block 906, the application determines the corrected elevation of the caller's device. In block 908, the application determines a street address corresponding to the location, in latitude and longitude, of the caller's device. In block 910, the application computes a floor number from the street address and the corrected elevation of the caller's device. Finally, in block 514 (also "YES" path of block 905), the application reports on the proximity between the user and an emergency responder attempting to find the user.

Thus, a computer implemented method, system or apparatus, and computer program product are provided in the illustrative embodiments for enhanced elevation detection for emergency response systems and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, at an emergency response system, a first location comprising a latitude and a longitude at which a first device is located;
   receiving, at an emergency response system, an air pressure reading measured by the first device;
   computing, using the air pressure reading and a mean sea-level barometric measurement, a first elevation of a device;
   computing, using the first location, a corresponding street address;
   computing, using the street address and the first elevation, a floor number;
   transmitting, to a second device, the street address and the floor number;
   receiving, at an emergency response system, location information for a responder;
   determining, using the street address, the first elevation, and the floor number, a horizontal distance and a vertical distance to the location of the responder;
   reporting, to the first device, the horizontal distance and the vertical distance;
   determining that the horizontal distance is below a horizontal distance threshold and that the vertical distance is below a vertical distance threshold; and
   reporting, to the first device, a proximity alert.

2. The method of claim 1, further comprising:
   determining, from a database using a processor and a memory, that the street address corresponds to a building having non-standard floor numbering;
   determining that the floor number is affected by the non-standard floor numbering; and
   adjusting, responsive to the first and second determining, the floor number to compensate for the non-standard floor numbering.

3. A computer usable program product comprising one or more computer readable storage medium, and program instructions stored on at least one of the one or more storage medium, the stored program instructions comprising:
   program instructions to receive, at an emergency response system, a first location comprising a latitude and a longitude at which a first device is located;
   program instructions to receive, at an emergency response system, an air pressure reading measured by the first device; and
   program instructions to compute, using the air pressure reading and a mean sea-level barometric measurement, a first elevation of a device;
   program instructions to compute, using the first location, a corresponding street address;
   program instructions to compute, using the street address and the first elevation, a floor number;
   program instructions to transmit, to a second device, the street address and the floor number;
   program instructions to receive, at an emergency response system, location information for a responder;
   program instructions to determine, using the street address, the first elevation, and the floor number, a horizontal distance and a vertical distance to the location of the responder; and
   program instructions to report, to the first device, the horizontal distance and the vertical distance;
   program instructions to determine that the horizontal distance is below a horizontal distance threshold and that the vertical distance is below a vertical distance threshold; and
   program instructions to report, to the first device, a proximity alert.

4. The computer usable program product of claim 3, further comprising:

program instructions to determine, from a database using a processor and a memory, that the street address corresponds to a building having non-standard floor numbering;

program instructions to determine that the floor number is affected by the non-standard floor numbering; and program instructions to adjust, responsive to the first and second determining, the floor number to compensate for the non-standard floor numbering.

5. The computer usable program product of claim 3, wherein the computer usable code is stored in a computer readable storage medium in a data processing system, and wherein the computer usable code is transferred over a network from a remote data processing system.

6. The computer usable program product of claim 3, wherein the computer usable code is stored in a computer readable storage medium in a server data processing system, and wherein the computer usable code is downloaded over a network to a remote data processing system for use in a computer readable storage medium associated with the remote data processing system.

7. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive, at an emergency response system, a first location comprising a latitude and a longitude at which a first device is located;

program instructions to receive, at an emergency response system, an air pressure reading measured by the first device; and program instructions to compute, using the air pressure reading and a mean sea-level barometric measurement, a first elevation of a device;

program instructions to compute, using the first location, a corresponding street address;

program instructions to compute, using the street address and the first elevation, a floor number;

program instructions to transmit, to a second device, the street address and the floor number;

program instructions to receive, at an emergency response system, location information for a responder;

program instructions to determine, using the street address, the first elevation, and the floor number, a horizontal distance and a vertical distance to the location of the responder; and program instructions to report, to the first device, the horizontal distance and the vertical distance;

program instructions to determine that the horizontal distance is below a horizontal distance threshold and that the vertical distance is below a vertical distance threshold; and program instructions to report, to the first device, a proximity alert.

\* \* \* \* \*